United States Patent [19]

Schrock et al.

[11] 4,265,018

[45] May 5, 1981

[54] GRASS TRIMMER DEVICE

[75] Inventors: Martin O. Schrock, Baltimore; Thomas J. Howard, Jr., White Marsh; Danny R. Jinkins, Bel Air, all of Md.

[73] Assignee: Black & Decker Inc., Towson, Md.

[21] Appl. No.: 934,746

[22] Filed: Aug. 21, 1978

[51] Int. Cl.³ .................. A01D 35/00; A01D 50/00
[52] U.S. Cl. .......................................... 30/276; 56/127
[58] Field of Search .................... 30/276, 347; 56/12.7

[56] References Cited

U.S. PATENT DOCUMENTS

| | | | |
|---|---|---|---|
| 3,104,510 | 9/1963 | Voigt | 30/347 X |
| 3,664,102 | 5/1972 | Reber | 56/295 |
| 3,670,413 | 6/1972 | Weber | 30/276 |
| 3,877,146 | 4/1975 | Pittinger | 30/276 |
| 4,065,913 | 1/1978 | Fisher | 56/12.7 |
| 4,089,114 | 5/1978 | Doolittle | 30/276 |
| 4,126,991 | 11/1978 | Gobin | 56/12.7 |

FOREIGN PATENT DOCUMENTS 1657039 10/1970 Fed. Rep. of Germany ............ 56/295

Primary Examiner—Jimmy C. Peters
Attorney, Agent, or Firm—Frank J. Thompson; Edward D. Murphy; Leonard Bloom

[57] ABSTRACT

A portable, cordless, electrically energized grass trimming device is disclosed having a rotary cutter blade which is formed of a flexible strip of material and which is mounted for rotation over a predetermined course. A blade stabilizing means is provided for restraining the blade along a segment of its length for maintaining rotary motion of the blade in the predetermined course upon impact with other objects. The flexibility of the blade is enhanced by mounting the blade for rotation over a course described by a curved surface of revolution and blade durability is improved by providing a means for absorbing impact shock when the blade strikes an object. An improved blade is described having integrally formed resilient means for absorbing the shock of impact.

14 Claims, 13 Drawing Figures

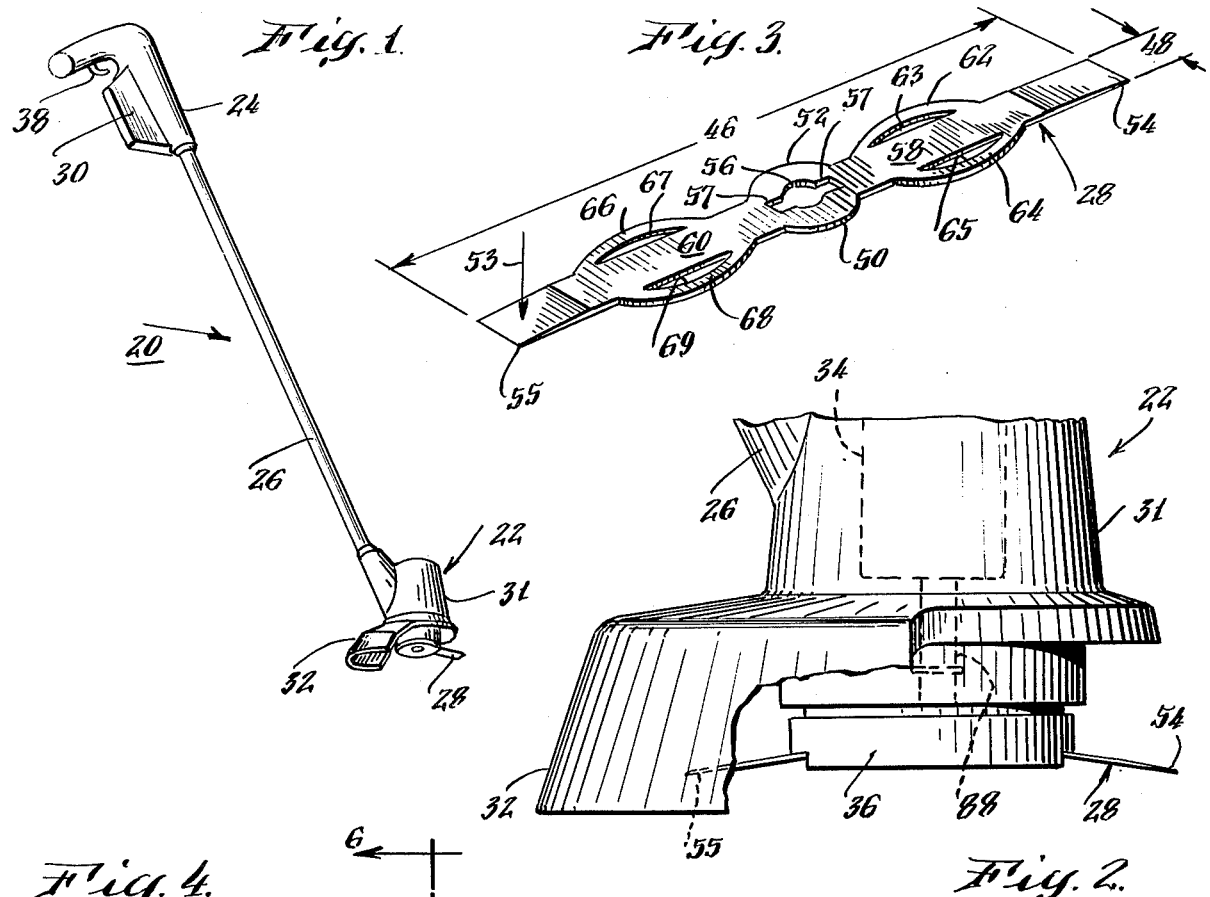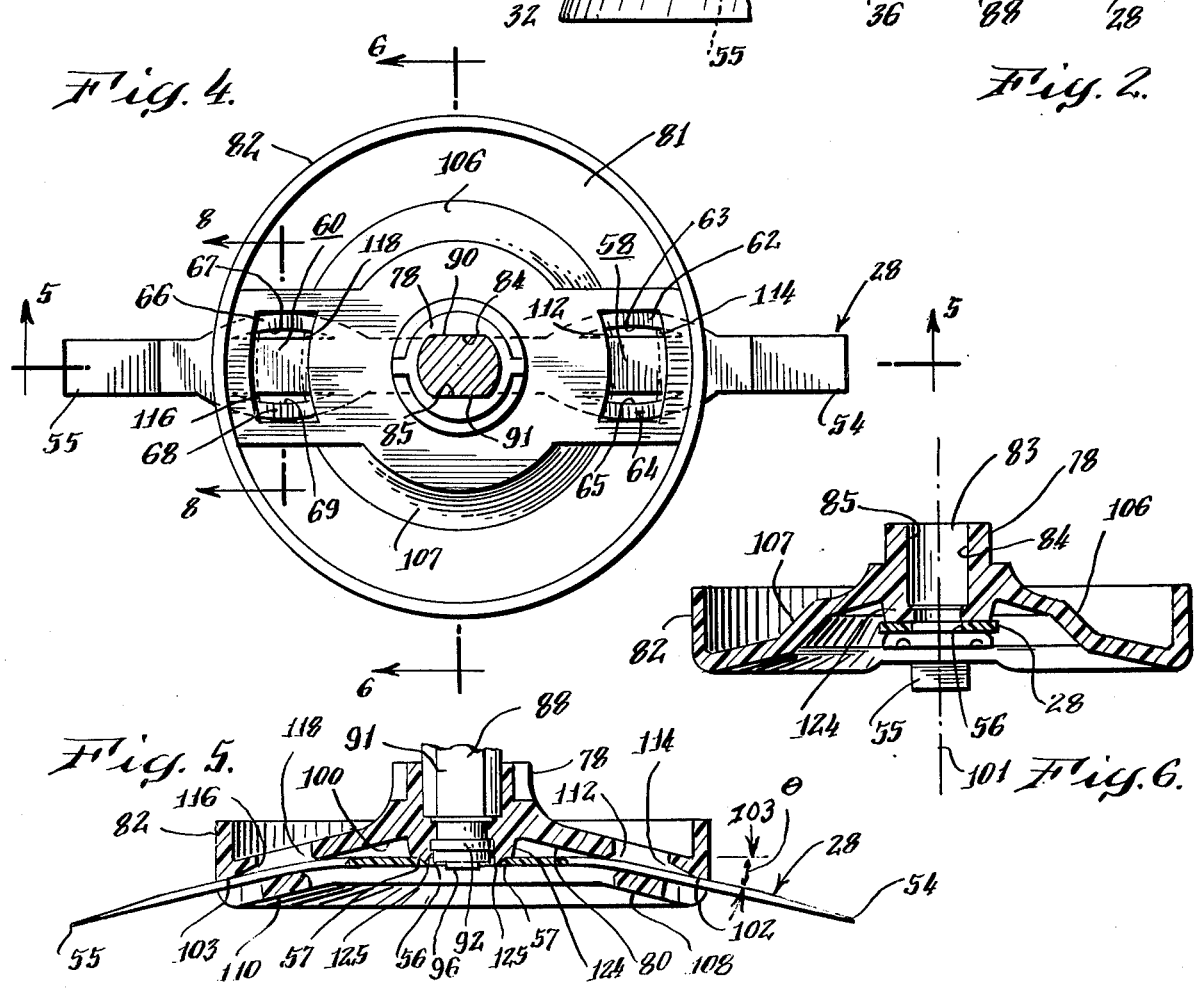

GRASS TRIMMER DEVICE

BACKGROUND OF THE INVENTION

1. Field of the Invention

This invention relates to grass cutting devices. The invention relates more particularly to an improved form of electrically energized device for trimming grass at difficult to reach locations.

2. Description of the Prior Art

Various electrically energized grass cutting devices are known for close trimming of grass and vegetation in areas which are difficult to reach. These areas comprise, for example, the areas immediately around the base of fence pickets and posts, around tree trunks, around bushes, along walls and about other structural objects and which are otherwise inaccessible to full sized lawn mowing devices. In the past, the design of such trimming devices has represented a compromise of contrasting requirements. On the one hand, trimming is enhanced by use of a cutting head which provides sufficient exposure of a rotating cutter blade so that the blade has access to the vegetation in close proximity to the structure. Grass about the object can then be cleanly cropped. On the other hand, exposure of the cutting blade increases the likelihood of blade impact with the structure and with other random objects, such as stones, thus increasing the possibility of breakage of the blade. Not only does blade breakage necessitate replacement and increase the cost and inconvenience of operation, but its impact with an object can result in a dangerous propelling of relatively small objects or of a fractured blade segment. In addition, since the blade is rotated at a relatively high rate, an exposed metal trimmer blade presents a potential hazard to the person of the user.

Accordingly, a metal blade grass trimmer has evolved which includes a housing having a protective skirt extending about the rotating metal blade. This skirt reduces contact between a rotating blade and the ground, structures and stones; it deflects projectiles resulting from blade impacts; and, it establishes a degree of personal protection to the user from a cuting edge of the blade. One such form of electrically energized trimming device provides for rotating a relatively sharp metal blade of small diameter, as, for example 3-½ inches. This blade which is rotated at a relatively high rate is supported in a housing and is circumscribed by a protective, toothed skirt or shroud. The skirt inhibits the rotating blade from touching the ground while the tooth perforations enable vegetation to extend through the skirt into the housing for shearing by the rotating blade. While the blade can be placed directly over the area to be trimmed, trimming with a sweeping motion of this device is limited since access between the grass to be cut and the blade is limited by the toothed blade skirt. In addition, a rapidly rotating blade of this device retains the capacity to cause projectiles and is subject to frequent breakage.

An alternative form of grass trimmer which has gained acceptance provides for rotation of a relatively small diameter line of a flexible material such as a polymer plastic formed from nylon. The line which extends from a hub is rotated at a speed sufficiently high to stiffen the line for shearing grass. This trimmer arrangement is advantageous principally because of the flexibility of the line material. A flexible line yields to objects and at times conforms to structures such as a wall base thereby reducing breakage and eliminating projectiles as well as providing enhanced trimming in places difficult to reach with a metal blade trimmer. In addition, while impact with a hand or foot of a person may bruise, the line substantially reduces serious injury. The line trimmer is however subject to greater wear than a metal blade and must frequently be replaced to maintain cutting efficiency. The inconvenience of replacing the cutting line is reduced to some extent by the provision of an automatic line feeder which, however, increases both the complexity and the cost of the apparatus and reduces its reliability.

We have found that grass trimmer devices can be used which employ flexible strip cutter blades of relatively low mass. We have discovered that the blades which are formed, for example, of a strip of a polymer material have exhibited a tendency to depart from an initial cutting plane upon impacting objects and to dwell temporarily at different cutting planes thus creating an undesirably uneven and scalloped appearing cut. Furthermore, these blades are subject to frequent breakage.

An important aspect of electrically energized grass trimming devices of the type described is portability. It is preferable that the trimming device be cordless and derive its electrical energy from a self contained battery power pack. It is found, however, that the line trimmer requires substantial energy while undulations between cutting planes of the strip trimmer is wasteful of energy. Both of these characteristics contribute undesirably to the size and weight of a battery pack required to attain extended usage.

SUMMARY OF THE INVENTION

Accordingly, it is an object of the invention to provide an improved form of grass trimming device.

Another object of the invention is to provide a grass trimming device having an improved flexible strip cutting blade.

Another object of the invention is to provide a grass trimmer device having a flexible strip blade which is supported for rotation over a predetermined course.

A further object of the invention is to provide an improved form of grass trimming device, having a flexible blade, and which is adapted to reduce blade breakage from impact with other bodies.

Another object of the invention is to provide a grass trimming device utilizing a blade having integrally formed shock absorbing means.

Another object of the invention is to provide an improved, cordless, electrically energized grass trimming device having a flexible strip cutter blade.

Another object of the invention is to provide an improved blade for a grass trimming device.

In accordance with the general aspect of the invention, a device for trimming grass is provided having a cutter blade mounted for rotation over a predetermined course and which is formed of a flexible strip material. A blade stabilizing means is provided for restraining the blade along a segment of its length for causing the blade to continue to rotate in the predetermined course upon impact with other objects.

In accordance with other features of the invention, the flexibility of the blade is enhanced by mounting the blade for rotation over a course defined by a surface of rotation and blade durability is improved by providing shock absorbing means for the blade. In a preferred embodiment, the blade is mounted for rotation in a depending concave configuration about a vertical axis and includes integrally formed elbow segments for absorbing the shock of impact with other objects.

BRIEF DESCRIPTION OF THE DRAWINGS

These and other objects and features of the invention will become apparent with reference to the following specification and to the drawings wherein:

FIG. 1 is a perspective view of a cordless grass trimmer device constructed in accordance with features of this invention;

FIG. 2 is an enlarged, fragmentary, partly broken away side elevation view of a cutter head of the device of FIG. 1;

FIG. 3 is a perspective view of one embodiment of a strip blade constructed in accordance with features of the invention;

FIG. 4 is a plan view of a mounting hub and cutting blade of FIG. 2;

FIG. 5 is a view taken along line 5—5 of FIG. 4;

FIG. 6 is a view taken along lines 6—6 of FIG. 4;

DETAILED DESCRIPTION

Figure 7:
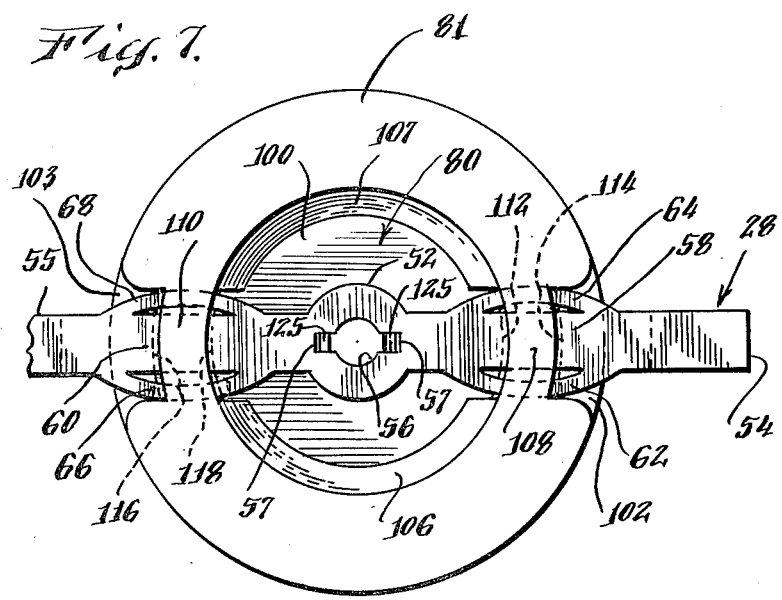
FIG. 7 is a bottom view of the mounting hub of FIG. 4.
Figure 8:
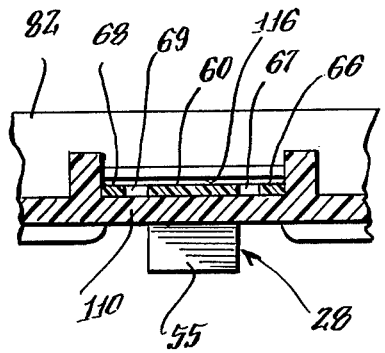
FIG. 8 is a fragmentary view taken along line 8—8 of FIG. 4.

Referring now to the drawings and particularly to FIGS. 1 and 2, rotary blade grass trimmer device 20 is shown to comprise a cutter head means 22, a gripping handle 24 and an elongated tubular rod 26 for positioning the cutter head means 22 at a convenient distance from the handle. The handle is preferably held by the user at or below waist level for positioning the cutter head means 22 adjacent the ground. The grass trimmer 20 is portable, electrically energized, cordless type wherein energy for exciting an electric motor and thereby actuating a blade 28 of the cutter head is provided by a battery power pack 30, which is mounted to the device.

The cutter head means is illustrated in greater detail in FIG. 2 and includes a housing member 31, a protective shroud 32 which is integrally formed with the housing member 31 and an electrically energized motor means 34 having a rotatable output shaft 88 to which is mechanically coupled a hub 36 for rotation therewith. Blade 28 is mounted to the hub 36, as indicated in greater detail hereinafter, and upon actuation of a switch 38 mounted on the handle 24 electrical energy is applied from the battery pack 30 to the motor means 34 through electrical wires, not shown, extending through the rod 26 for imparting rotary motion to the hub 36.

The cutter blade 28 as shown in detail in FIG. 3, comprises an elongated strip body having a length 46, a width 48 and a uniform thickness 50 over a relatively large segment of its length. For purposes of this specification and the appended claims, the term strip is understood to mean a rectangular body having a length substantially greater than its width and having a width substantially greater than its thickness. The blade 28 is dimensioned and is formed of a material which imparts flexible characteristics to the blade. While the blade may be formed of various materials, it should comprise a body of a relatively low mass. It is preferably formed of a material such as a polymer plastic, as for example a thermoplastic. A preferred thermoplastic is nylon. The blade 28 is flexible insofar as the application of finger pressure to the blade supported at a central segment 52, in a direction normal to a plane including its length 46 and width 48, as represented by the arrow 53 causes the blade to bow substantially. On the other hand, the blade exhibits a relative stiffness in the direction of the width 48, and a similar finger pressure applied in that direction will be insufficient to deflect the blade in that direction. This characteristic imparts a stiffness to distal cutting segments 54 and 55 of the blade. Useful cutting stiffness is provided by blades having a range of thicknesses and a range of widths. The thickness of a blade should be sufficiently large to avoid flutter during rotation, to present a body having a sufficient thickness for cutting another body, and to be relatively durable. On the other hand, the blade thickness should have a value which avoids having to displace a relatively large quantity of air at a leading edge of the rotating blade and which reduces aerodynamic drag. The blade width is selected to have a minimum value for establishing a relatively rigid body for a selected cutting thickness and to have a maximum value which avoids introducing substantial drag and is not wasteful of material. For thermoplastic materials and particularly for the nylon described hereinbefore, the range of thicknesses meeting these characteristics extends from about 0.020 inch to about 0.06 inch and a range of thickness extends from a lower value of about 0.200 inch to a larger value of about 0.5 inch to about 1.00 inch. Exemplary dimensions of a typical blade which are not deemed limiting of the invention in any respect and which provide these characteristics for the above indicated material provide a length 46 of about 4 inches, a width 48 of about 0.3 inches and a thickness 50 over a major portion of the length of the blade of about 0.032 inches.

The blade 28 includes enlargements in its width along the blade length. The central segment 52 is enlarged to provide a mounting aperture 56 and a pair of slots 57 communicating with the aperture which facilitate positioning the blade 28 on the mounting hub 36. The blade further includes enlargements in its width at first and second locations 58 and 60 which are located intermediate the distal segments 54 and 55 and the central segment 52 respectively. The intermediate segment 58 includes first and second, integrally formed, resilient, bowed out, arc shaped segments 62 and 64 respectively which extend from the strip in a plane formed by the length and width of the blade. Spacings 63 and 65 are formed between the segments 62 and 64 respectively and the body of the blade. This spacing enables deflection of these resilient segments toward the blade body upon impact between a distal blade segment and an object, as is described more fully hereinafter. Since the blade 28 is formed of a strip of flexible material, one of the segments 62 and 64, depending upon the direction of rotation of the blade, will yield upon impact and deflect into the space 63 or 65. The deflection will absorb a substantial part of the impact energy and these segments thus act as shock absorbers for the blade. After impact, the resilient segments will be automatically restored to their initial configuration. The blade segment 60 includes similar first and second, integrally formed resilient, bowed out, arc shaped segments 66 and 68 and spacings 67 and 69 respectively between these segments and the body of the blade. The distal end segments 54 and 55 each taper and decrease in thickness from a relatively larger uniform body thickness 50 at a radial location adjacent the intermediate blade segments 58 and 60 to a relatively smaller thickness at their outer edges. The tapering enhances both the cutting action and the flexibility of the blade. In the exemplary blade described hereinbefore, the distal segment 54 has a length of about 0.5 inch and decreases from a relatively larger thickness of about 0.036 to about 0.030 inches to an outer, relatively smaller thickness of about 0.028 to about 0.018 inches. The blade 28 is symmetrical about the aperture 56 and the distal segment 55 exhibits the same length and variation in thickness as the segment 54.

A means for mounting the blade body 28 for rotary motion over a predetermined course comprises the hub 36 formed by a generally circular shaped hub body (FIGS. 4-7) having an integrally formed mounting segment 78, an integrally formed surface segment 80, an integrally formed collar segment 81, and an integrally formed longitudinally extending wall segment 82. The shaft mounting segment 78 is generally cylindrically shaped and includes an upper drive coupling bore segment 83 having a cross-sectional configuration for engaging an output shaft 88 of the motor means 34 for imparting rotary motion to the hub. The cross-sectional configurations of the segment 83 and the shaft 88 are best illustrated in FIGS. 4 and 5. Hub segment 83 includes flat segments 84 and 85. The output shaft 88, which is generally cylindrically shaped, includes flats 90 and 91 formed thereon, for engaging the hub flats 84 and 85 respectively. The flats on the output shaft 88 and on the hub mounting segment 78 impart rotary motion from the shaft to the hub. Cylindrically shaped output shaft 88 extends into the lower cylindrical hub mounting segment 86 and engages the hub at that location. The engagement is provided between an O ring 92 (FIG. 5) which is positioned in a groove formed on a distal segment of the shaft 88 and a ledge (not illustrated) formed on a lower cylindrical wall surface of the hub mounting segment 86. A distal cylindrical segment 96 (FIG. 5) of the drive shaft 88 has a tapered edge which facilitates the positioning of the central aperture 56 of blade 28 on this shaft segment, as indicated hereinafter.

The described mounting arrangement facilitates removal of the hub from the output shaft 88 for cleaning of accumulated grass and debris, if any. The hub 36 can be conveniently removed from the shaft 88 by a firm hand force applied in a downward direction as viewed in FIG. 5. The hub 36 is conveniently refitted on the shaft 88 with firm hand pressure applied in the opposite direction. The interference fit between the O ring and hub will retain the hub on a shaft during the cutting operation.

The hub surface segment 80 includes a first integrally formed, centrally located recessed surface 100 which is curved in the direction of a longitudinal axis 101 and outer peripheral segments 102 and 103 providing a concave surface configuration. The raised integrally formed collar segment 81 is circular and is spaced radially and longitudinally from the central surface segment 100 by frusto conical segments 106 and 107. The collar segment 81 has a narrowed width at diametrically opposed locations thereof. These narrowed collar segments 108 and 110 (FIG. 7) define with the curved surfaces 100, 102, 103 and the surfaces 106 and 107 slot pairs 112, 114 and 116 and 118.

Figure 12:
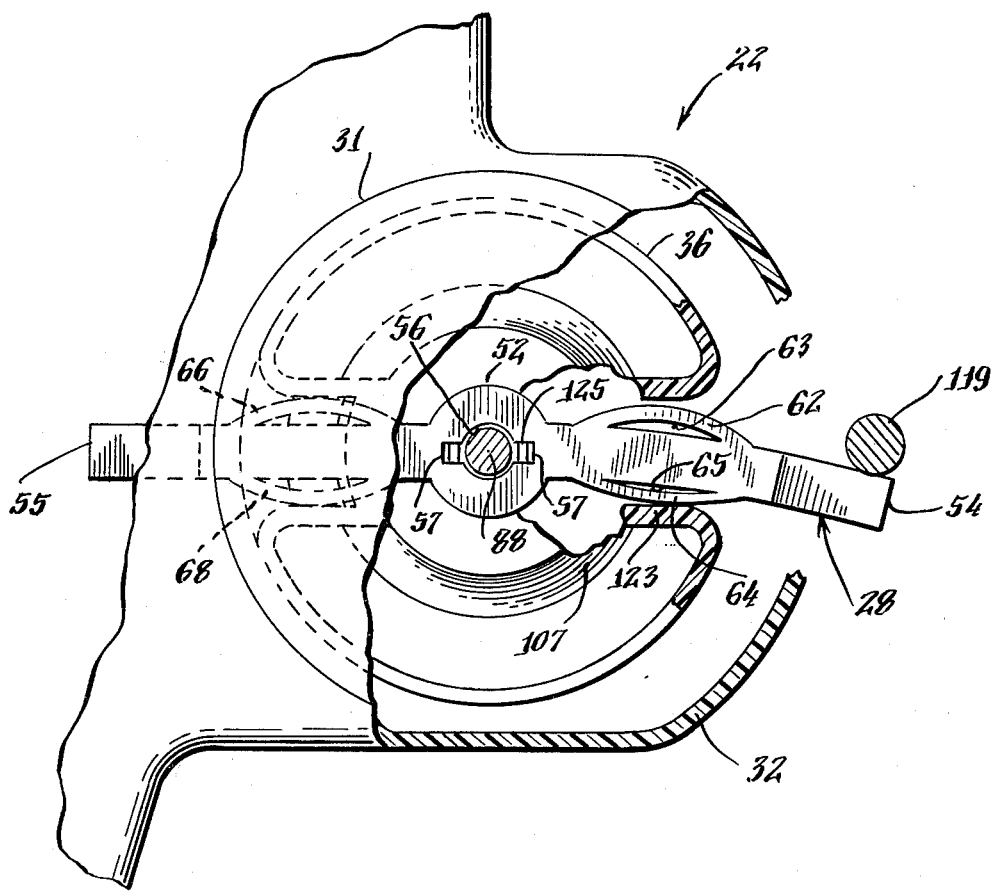
FIG. 12 is a fragmentary, partly broken away, partly sectional, plan view of the device of FIG. 2 illustrating a cutter blade of the invention impacting another object.

The blade body 28 is mounted on the hub body 36 and is restrained along a portion of its length by the hub for rotating the blade over a predetermined course and for maintaining it in this course after impact, as illustrated in FIG. 12, with an object 119. The central segment 52 of the blade is positioned on an integrally formed, cylindrically shaped, raised hub segment 124 (FIGS. 5 and 6). The blade 28 is extended through one of the slot pairs 112, 114 or 116, 118 and a pair of extending bosses 125, which facilitate positioning the blade, align with and engage the slots 57 formed in the central segment 52 of the blade. In a mounted position the intermediate segments 58 and 60 of the blade extend through the slot pairs 112, 114 and 116, 118 respectively, as shown. The blade will thus be deflected in an axial direction from the central segment 52 to conform with the curved surfaces 100, 102 and 103. It will be restrained in this deflected position by virtue of the bridging collar segments 108 and 110. Because of the restraint imparted to the blade along a segment of its length by the collar segments 108 and 110, the blade distal segments will continue to rotate in the predetermined course after impact with an object. Thus, a means is provided for restraining the blade from assuming and dwelling at different rotational courses after impact with objects. The extent of the length over which the blade is restrained to maintain rotation in a predetermined cutting course upon impact with an object is dependent upon the length, width and thickness of the blade, the rate of rotation, and the material from which the blade is fabricated. In general, the blade should be supported over no less than about 60% of its length. With the exemplary blade given above and described with respect to FIGS. 4 through 7, each distal segment 54 and 55 of the blade 28 is a free extension of about ½ inch and the blade is supported over about 75% of its length or about 3 inches.

The blade body is mounted and restrained for rotation over a predetermined course. The predetermined course will be defined by a surface of revolution about the axis 101 and comprises a segment of a conical surface. A course defined by the illustrated arrangement is a frusto conical surface segment of a cone. This frusto conical surface extends longitudinally from the hub body in a direction away from the hub and when the trimmer is positioned for cutting, depends from the hub 36. The mounting of the blade for positioning at an angle $\theta$ which is more than 0° with respect to a transverse axis 103 as illustrated in FIG. 5, enhances the flexibility of the blade upon impact with objects. As indicated hereinbefore the blade is relatively stiff in the direction of its width 48 and in its direction of rotation. The blade upon impact with an object can be deflected vertically and therefore exhibits a yield to the object which reduces breakage of the blades. The angle $\theta$ is selected to provide a blade attitude which vertically depends for enhancing deflection of the blade upon impact with an object and to extend horizontally to enable cutting. The blade has operated well with a $\theta$ of about 13°.

As illustrated in FIGS. 5 and 7, the intermediate segments 58 and 60 of the blade are positioned in and extend through the slot pairs 116, 118 and 112, 114 respectively. Upon impact with an object, the blade is forced against and is restrained laterally by a segment of the hub body 36. The energy of impact is partly absorbed by the resilient blade segments 62, 64 and 66, 68 described hereinbefore with respect to FIG. 3. An exemplary impact with an object 119 is illustrated in FIG. 12. On impact, a resilient blade segment 64 adjacent a laterally restraining hub segment 123 is slightly deformed into the adjoining space 65. After impact the resilient segment 123 will automatically restore substantially to its initial configuration prior to impact. The resilient segment 64 thus absorbs a portion of the impact energy, acts as a shock absorber, and substantially reduces breakage of the blade.

Figure 13:
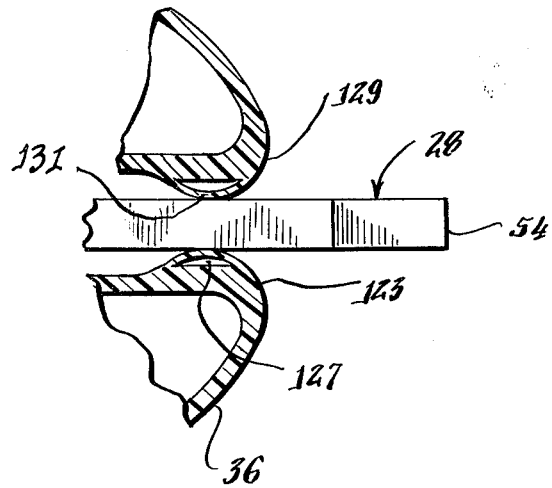
FIG. 13 is a sectional view of an alternate embodiment that has shock absorbing means on the hub.

In an alternative arrangement, a resilient impact shock absorbing means is mounted to the hub 36 rather than the blade 28. FIG. 13 illustrates this arrangement wherein the hub wall segment 123 includes an integral resilient, arc shaped segment which is deformable into a space 127 for absorbing impact shock. The laterally positioned wall segment 129 also includes a similar resiliently deformable segment 131.

Figure 9:
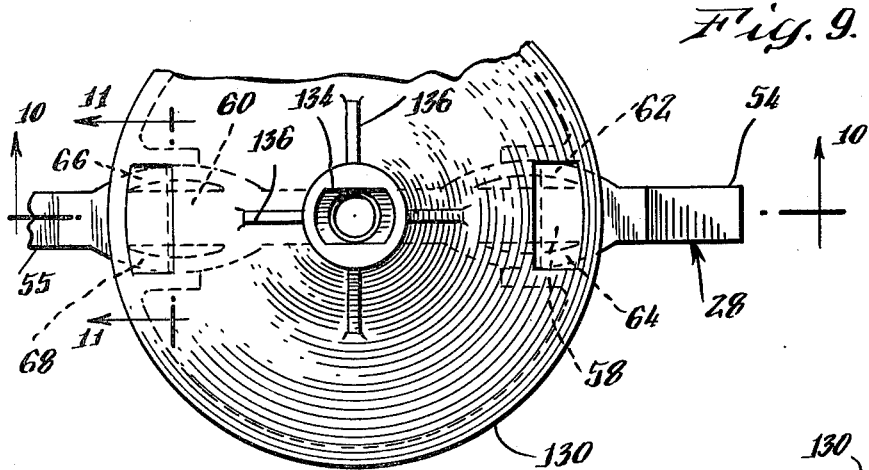
FIG. 9 is a plan view of an alternative embodiment of a hub of the device of FIG. 2.
Figure 11:
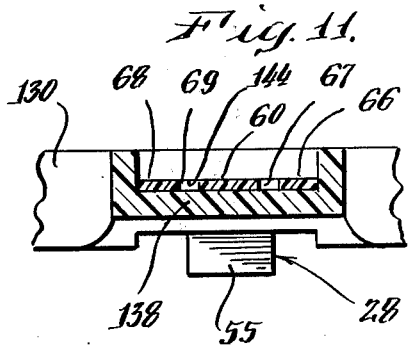
FIG. 11 is a fragmentary view taken along lines 11—11 of FIG. 9.
Figure 10:
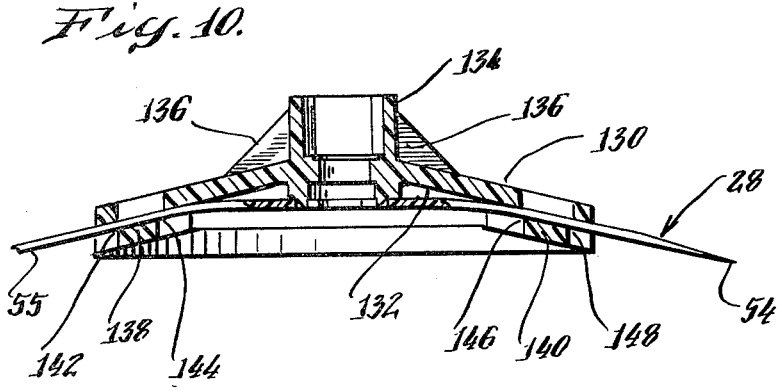
FIG. 10 is a view taken along lines 10—10 of FIG. 9.

An alternative form of hub body is illustrated in FIGS. 9 through 11. Those elements of FIGS. 9 through 11 which perform functions similar to hub segments described hereinbefore bear the same reference numerals. The hub of FIGS. 9 through 11 comprises a generally disc shaped body 130 having a curved surface 132 which causes the blade 28 to rotate over a desired course. A hub mounting segment 134 is provided which is buttressed to the disc body 130 by rib buttress segments 136. Bridge segments 138 and 140 are integrally formed with the disc body 130 and define slots 142, 144 and 146, 148 respectively through which the blade 28 extends and is restrained in position. In other respects, the mounting of the blade to the hub of FIGS. 4 through 7 is similar to the above description.

An improved portable, cordless electrically energized grass trimmer device has been described utilizing a relatively low mass, plastic strip blade. A means is provided for mounting and restraining the blade for rotation over a predetermined course thereby inhibiting the blade from dwelling at different cutting planes or courses upon impact with an object. The blade is mounted and depends from a hub which enhances flexibility of the blade upon impact with an object. Shock impact is absorbed by means integrally formed with the blade or alternatively by means on the hub. Breakage of the blade is thus reduced and durability is thus enhanced.

While there have been described particular embodiments of the invention, it will be appreciated by those skilled in the art that variations may be made thereto without departing from the spirit of the invention and the scope of the appended claims.

What is claimed is:

1. A cordless, portable grass trimmer device having a single cutter blade comprising:
   (a) a unitary, elongated cutter blade body formed of a strip of flexible material;
   (b) said blade body have a generally rectangular shape including a length, a width and a thickness;
   (c) said blade body dimensioned to provide flexibility thereof upon application of finger pressure thereto in a direction normal to a plane of the body which includes said length and width, and, to exhibit stiffness in the direction of said width;
   (d) said blade body having a rotational axis normal to said plane and centrally located along said length;
   (e) said blade body having first and second cutting segments symmetrically located about said axis at distal, opposite ends of the length of said body;
   (f) means for mounting said blade body for rotating said blade body in a predetermined course about said rotational axis;
   (g) said blade body subject to deflection from rotation in said predetermined course upon impact with an object;
   (h) said blade mounting means supporting and restraining said blade over a segment which is at least 60 percent of the length of said blade, said supported segment including said axis of rotation whereby rotation of said blade is maintained in said predetermined course upon impact with an object; and
   (i) an electrically energized motor means for rotating said blade.

2. The grass trimmer of claim 1 wherein said blade is supported for rotation over about 75% of the length of said blade which supported segment includes the axis of rotation.

3. A cordless, portable grass trimmer device having a single cutter blade comprising:
   (a) a generally rectangular shaped, unitary cutter blade body formed of a strip of flexible polymer plastic material, said blade having a length (L);
   (b) a generally cylindrically shaped hub for mounting said blade for rotation;
   (c) said hub including a centrally located rotational axis and restraining means spaced radially from said axis at diametrically opposite locations;
   (d) said cutter blade body positioned on said hub and mounted thereto by said restraining means;
   (e) said restraining means spaced apart a distance equal to at least about 60% of (L) for engaging said unitary blade at two locations along said blade body length (L); and,
   (f) means for rotating said hub.

4. The grass trimmer of claim 3 wherein said hub rotating means includes a plurality of slots integrally formed in said hub and said cutter blade extends through said slots for restraining said blade on said hub.

5. A portable, cordless grass cutting device having a single cutter blade comprising:
   (a) a cutter head means;
   (b) a handle and an elongated body coupling said handle to said cutter head for positioning said handle at about waist level and for positioning said cutter head near the ground;
   (c) a source of electrical energy supported on said device;
   (d) said cutter head means including an electric motor;
   (e) switch means at said handle for applying electrical energy from said source to said electrical motor;
   (f) said motor having a rotary output shaft;
   (g) a single cutter blade body comprising a strip of generally rectangular shaped flexible polymer plastic material;
   (h) said blade body having a length and a rotational axis centrally located along said length;
   (i) means mounted to said shaft for rotation therewith and for supporting said cutter blade for rotation about said axis and over a predetermined course;

(j) said blade body subject to deflection from rotation in said predetermined course upon impact with an object; and, (k) means for restraining said strip over a segment of at least about 60% of its length for maintaining rotation of said blade in said predetermined course upon impact of said blade with an object.

6. The grass trimmer device of claim 5 wherein said means for mounting said blade to said shaft comprises a rotatable hub having a periphery thereof and means for restraining said blade at locations adjacent said periphery.

7. A cordless portable grass trimmer comprising:
(a) a single, unitary, flexible cutter blade body formed of a strip of polymer plastic material, said blade body having a length, a central segment, distal cutter segments and intermediate segments positioned between said central segment and said distal segments, and a rotational axis centrally located along said length.
(b) a hub body for mounting said blade for rotation therewith;
(c) means for rotating said hub body; and
(d) resilient means integrally formed with said blade body along said length at said intermediate segment between the cutter segment and said axis for absorbing energy occurring as a result of an impact between said blade and an object.

8. The grass trimmer device of claim 7 wherein said resilient means comprise first and second resiliently deflectable bow shaped segments integrally formed with said blade and extending in a plane including a length and a width of said blade, said bow shaped segments are spaced from said blade to provide an intermediate space for enabling resilient deflection of said segments therein upon impact of the blade with an object.

9. The grass trimmer of claim 7 wherein said resilient means comprises first and second bow shaped segments integrally formed with said blade and extending in a plane including a width and length of said blade and said bow shaped segments are spaced on opposite sides of the width of the blade at each of said intermediate locations.

10. The grass trimmer of claim 9 wherein said first and second integrally formed bow shaped segments are symmetrically positioned about the width of said blades.

11. The grass trimmer of claim 7 wherein said blade includes a central segment, first and second distal segments thereof, first and second intermediate segments positioned between said central segment and said first and second distal segments respectively, and said resilient means is integrally formed with each said intermediate segments and extends in the plane including a length and width of said blade.

12. The grass trimmer device of claim 7 wherein said means for mounting said blade to said shaft includes a hub having a segment for restraining said blade in a plane of rotation upon impact with an object and said resilient means comprises a bow shaped segment extending in a plane including said length and a width of said blade, said resilient means is positioned for engaging said restraining segment on impact of said blade with an object.

13. A cordless, portable grass trimmer comprising:
(a) a single, unitary, flexible cutter blade body formed of a strip of polymer plastic material, said blade body having a length and a rotational axis centrally located along its length and cutter segments symmetrically positioned about said axis;
(b) a hub body for mounting said blade for rotation therewith;
(c) means for rotating said hub body; and
(d) resilient means integrally formed with said hub body for resiliently engaging said blade body and absorbing energy imparted to said blade body upon impact between said blade and an object.

14. The grass trimmer of claim 13 wherein said resilient means comprises bow-shaped segments integrally formed with said hub.

* * * * *